Oct. 17, 1967  R. G. KOCH  3,347,115
AXIALLY ADJUSTABLE TOOL HOLDER CONSTRUCTION
Filed Aug. 31, 1966

INVENTOR.
ROLAND G. KOCH
BY
Learman, Learman & McCulloch
ATTORNEYS

United States Patent Office 3,347,115
Patented Oct. 17, 1967

3,347,115
AXIALLY ADJUSTABLE TOOL HOLDER
CONSTRUCTION
Roland G. Koch, Frankenmuth, Mich., assignor to Universal Engineering Company, Frankenmuth, Mich., a corporation of Michigan
Filed Aug. 31, 1966, Ser. No. 576,414
3 Claims. (Cl. 77—58)

ABSTRACT OF THE DISCLOSURE

A tool holder wherein a body member has an axially extending bore with a conical seat at one end and a radial shoulder at the other, a tool support member nonrotatable in said bore has an end extending into the bore with a slotted tubular section received in the bore adjacent the radial shoulder, an adjusting sleeve in threaded engagement with the tool support member has a slotted, tapering surface in engagement with the seat, and spring means is operative to bias the tool support member such that rotational movement of the adjusting sleeve on the tool support member achieves concentric axial adjustment of the tool support member relative to the body member in either direction.

---

This invention relates to a tool holder construction and more particularly to a holder for a tool support which enables axial adjustment of the tool support relatively to its holder without necessitating removal of the support from its holder.

In the precision machining of workpieces, it is necessary that the cutting tool be positioned accurately with respect to the workpiece to be machined. The positioning of the cutter conventionally is effected by placing the tool in its support and by initially locating the support in a tool holder apparatus in a location roughly approximating the position the tool should occupy when machining operations are to be performed. Thereafter, fine adjustments are made to effect precise locating of the tool.

An object of this invention is to provide improved apparatus for enabling fine adjustments of a tool to be effected without necessitating disassembly of any of the tool supporting parts.

Another object of this invention is to provide apparatus of the character indicated and in which the positioning of a tool relatively to its holder is greatly simplified and expedited.

Further object of the invention is to provide tool holder apparatus of the kind referred to and wherein adjustment of a tool to the desired location automatically effects coaxial positioning of the tool and its holder.

Other objects and advantages of the invention will be pointed out specifically or will become apparent from the following description when it is considered in conjunction with the appended claims and the accompanying drawings, in which:

Figure 1:
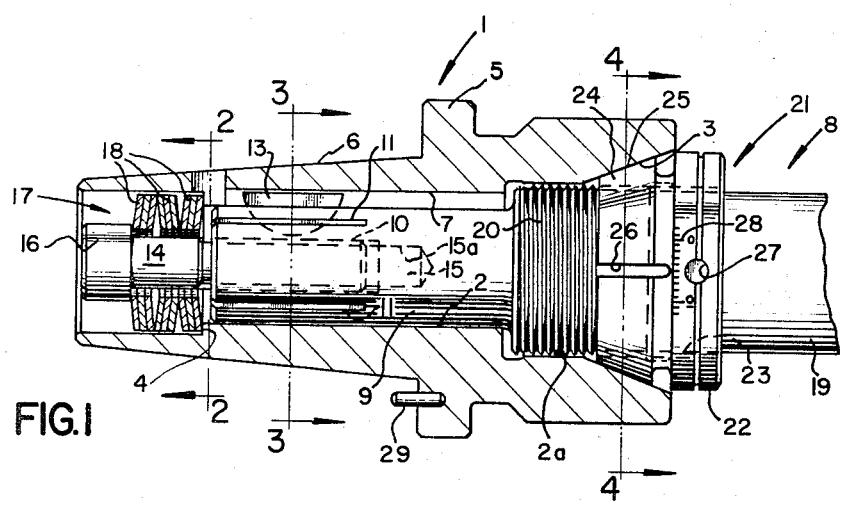
FIGURE 1 is a fragmentary, longitudinal sectional view illustrating a tool holder constructed in accordance with the invention.
Figure 2:
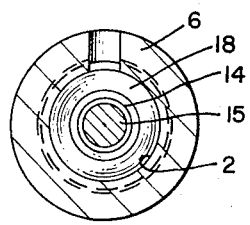
FIGURE 2 is a sectional view taken on the line 2—2 of FIGURE 1.
Figure 3:
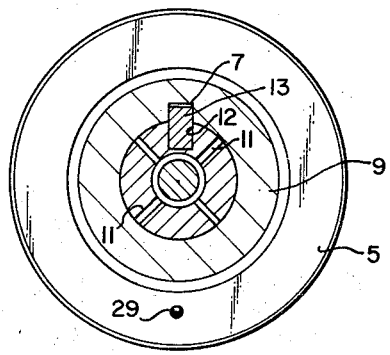
FIGURE 3 is a sectional view taken on the line 3—3 of FIGURE 1.
Figure 4:
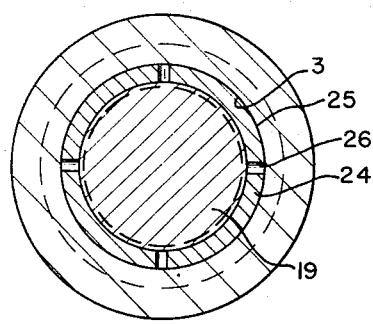
FIGURE 4 is a sectional view taken on the line 4—4 of FIGURE 1.

A tool holder constructed in accordance with the disclosed embodiment of the invention comprises a tubular body member 1 having an axial bore 2 extending completely through the body and terminating at one end in an outwardly flaring frusto-conical seating portion 3 and having adjacent its other end a radial shoulder 4. The holder 1 may be of the general character of the holder disclosed in U.S. Patent No. 2,719,722. Substantially midway between its ends the body 1 is provided with an external annular flange 5 and a tapered shank 6 extends rearwardly from the flange 5 for accommodation in an adaptor of the character described in the patent mentioned which is received in the machine tool spindle. An axially extending slot 7 is provided in the bore 2 for a purpose presently to be explained.

The body 1 is adapted to accommodate a tool support member 8 having a shank portion 9 of such diameter as snugly to be received in the bore 2. The rear end of shank 9 preferably is bored as at 10 and axially extending slots 11 provided in this end of the shank 9 enable radial expansion and contraction of the terminal end of the shank. The shank also preferably is provided with a key seating slot 12 for the accommodation of a key 13 which also is received in the slot 7 so as to preclude relative rotation between the members 1 and 8.

As is indicated in FIGURE 1, the length of the shank portion 9 is such that it terminates short of the shoulder 4. However, an adjustable clamping bolt 14 has a threaded shank 15 which extends into a tapped opening 15a formed at the base of the bore 10 and has an enlarged head 16 which extends beyond the shoulder 4. Between the shoulder 4 and the head 16 is spring means 17, comprising compressible resilient Belleville washers 18, which are capable of reacting between the shoulder 4 and the bolt head 16 so as to exert a constant force on the member 8 tending to urge it to the left, as viewed in FIGURE 1.

The forward end of the shank 9 terminates in an enlarged tool supporting bar 19 such as a boring bar, a portion of which is threaded as is indicated at 20. The threads preferably are of the truncated type so as to have flat, outer surfaces which may bear snugly against an enlarged portion 2a of the bore 2 without damage to the threads. The bore portion 2a is not threaded, but its diameter does conform substantially to the diameter of the threaded bar portion 20.

Mounted on the bar 19 is an adjusting member 21 comprising an annulus 22 having a bore 23 threaded to correspond to the threads 20 so as to be axially adjustable relatively to the bar 19. The member 21 includes an integral skirt 24 having a tapering or frusto-conical outer surface 25 which is complementary to the seating surface 3 and which is adapted to engage and seat on the latter. The skirt 24 is axially slotted as at 26 so as to enable radial expansion and contraction of the skirt.

The annulus 22 is provided with a plurality of radial openings, one of which is shown at 27, adapted to receive the lugs on a spanner wrench (not shown) so as to facilitate rotation of the member 21. A vernier scale 28 preferably is provided on the annulus 22 and is adapted to be read in conjunction with a mark (not shown) on the face of the body 1 to indicate the amount of relative rotation of the members 1 and 21.

To condition the apparatus for operation, a tool bit or other cutter (not shown) is mounted on the support member 19 in any conventional manner. The members 16 and 21 may be adjusted relatively to the bar 19 so as initially to locate the member 19 relatively to the body 1 such that the distance from the rear face of the flange 5 to the cutting tool approximates the desired distance that the tool bit should be located from the chuck or the like in which the apparatus is to be mounted. Thereafter, the shank 6 of the body 1 may be inserted in the spindle adaptor.

A pin 29 secured to the flange 5 and projecting from its rear face is provided to cooperate with the spindle adaptor in the manner disclosed in the aforementioned patent.

Prior to assembly of the body 1 with the spindle adaptor, the adjusting bolt 14 will be manipulated so as to compress the spring means 17 such an amount as to cause the surface 24 of the adjusting member 21 to be firmly seated on the seating surface 3 of the body 1, but the springs 18 should not be so compressed as to preclude movement of the member 19 in either direction relatively to the body 1.

Following assembly of the body 1 with the spindle adapter, the adjusting member 21 may be rotated relatively to the member 19 whereupon the latter will be adjusted axially in one direction or the other relatively to the body 1 so as to locate the tool bit precisely at the desired position. Because the relative position of the scale 28 and the mark on the body 1 may be recorded, the tool bar may be returned to exactly the same position relative to a workpiece if it is necessary to replace the tool. The capability of the skirt 24 to expand and contract radially, and the corresponding capability of the rear portion of the shank 9, assures a coaxial relationship between the member 19 and the member 1. In all positions of relative adjustment of the members 1 and 19, the spring means 17 constantly will exert a force on the member 19 tending to urge it to the left, as viewed in FIGURE 1.

The disclosed embodiment is representative of presently preferred forms of the invention but is intended to be illustrative rather than definitive thereof. The invention is defined in the claims.

What is claimed is:

1. A holder for a tool or the like comprising: a body member having an axially extending bore terminating at one end in a conical seat and at the other end in a radial shoulder; a tool support member having one end thereof extending into said bore from said one end of the body member and terminating in a slotted tubular section with slots open to the said one end thereof; means operative to prevent relative rotational movement between said body member and tool support member; a retaining member extending axially from said one end of said tool support member beyond said shoulder; resilient means interposed between said shoulder and said retaining member and biasing said tool support member in a direction toward said other end of said bore; adjusting sleeve means in threaded engagement with said tool support member and having a slotted tapering surface axially spaced from said slotted tubular section and complemental to and in engagement with said seat, with slots open to an end thereof, whereby rotational movement of said adjusting means relative to said tool support member enables concentric axial adjustment of said tool support member relative to said body member in either direction.

2. The construction set forth in claim 1 wherein said retaining member comprises a bolt and said one end of the tool support member has a threaded axial bore axially adjacent to said slotted tubular section receiving said bolt.

3. The construction set forth in claim 1 wherein cooperative circumferential graduation means is provided for said adjusting sleeve means and tool support members.

References Cited
UNITED STATES PATENTS 2,669,890  2/1954  Tao.
3,073,186  1/1963  Flannery.
3,116,653  1/1964  Lombardo.

WILLIAM W. DYER, JR., *Primary Examiner.*

GERALD A. DAST, *Examiner.*